US006581872B2

United States Patent
Walmsley

(10) Patent No.: US 6,581,872 B2
(45) Date of Patent: Jun. 24, 2003

(54) CIRCULAR VERTICAL TAKE OFF & LANDING AIRCRAFT

(76) Inventor: Eric Ronald Walmsley, 21, Howard Crescent, Seer Green, Beaconsfield Buzks (GB), HP9 2XR ( * ) Notice: Subject to any disclaimer, the term of this patent is extended or adjusted under 35 U.S.C. 154(b) by 0 days.

(21) Appl. No.: 09/967,840

(22) Filed: Oct. 1, 2001

(65) Prior Publication Data

US 2003/0098388 A1 May 29, 2003

(30) Foreign Application Priority Data

Aug. 8, 2001 (GB) .............................................. 0119318

(51) Int. Cl.⁷ ............................................... B64C 29/00
(52) U.S. Cl. ..................... 244/12.2; 244/23 C; 244/12.4
(58) Field of Search ............................. 244/23 A, 23 B, 244/23 C, 12.1, 12.2, 12.4, 12.5, 12.6, 67, 186, 190, 82, 61; 416/20 A, 20 R

(56) References Cited

U.S. PATENT DOCUMENTS

| | | | | |
|---|---|---|---|---|
| 3,031,157 A | * | 4/1962 | Varden | 244/12.4 |
| 3,088,694 A | * | 5/1963 | Vass | 244/12.3 |
| 3,109,494 A | * | 11/1963 | Davidson et al. | 244/207 |
| 3,167,273 A | * | 1/1965 | Calderon | 244/12.4 |
| 3,599,902 A | * | 8/1971 | Thomley | 244/12.2 |
| 4,023,751 A | * | 5/1977 | Richard | 244/23 C |
| 4,214,720 A | * | 7/1980 | DeSautel | 244/12.2 |
| 4,386,748 A | * | 6/1983 | Jordan | 244/12.2 |
| 4,457,476 A | * | 7/1984 | Andresevitz | 244/23 C |
| 4,726,545 A | * | 2/1988 | Kress | 244/12.3 |
| 4,807,830 A | * | 2/1989 | Horton | 244/12.2 |
| 5,072,892 A | * | 12/1991 | Carrington | 244/12.2 |
| 5,152,478 A | * | 10/1992 | Cycon et al. | 244/12.2 |
| 5,178,344 A | * | 1/1993 | Dlouhy | 244/12.2 |
| 5,303,879 A | * | 4/1994 | Bucher | 244/12.2 |
| 5,351,913 A | * | 10/1994 | Cycon et al. | 244/12.2 |
| 5,503,351 A | * | 4/1996 | Vass | 244/12.2 |
| 5,730,390 A | * | 3/1998 | Plichta et al. | 244/12.3 |
| 5,881,970 A | * | 3/1999 | Whitesides | 244/12.2 |
| 6,050,520 A | * | 4/2000 | Kirla | 244/10 |
| 6,382,560 B1 | * | 5/2002 | Ow | 244/12.2 |

* cited by examiner

Primary Examiner—Charles T. Jordan
Assistant Examiner—Stephen A Holzen

(57) ABSTRACT

A circular VTOL aircraft with a central vertically mounted turboprop engine (14), driving contra-rotating co-axial propellers (24), above a central jet engine, or engines (12), horizontally mounted on a turntable pod (11) which is steerable through 360 degrees. The turboprop provides vertical thrust from contra-rotating propellers compressing air from an upper circular intake (5) downward through a funnel-shaped rotor-chamber (6) to a circular vent (10) at the base of the craft. The resulting column of compressed air supports the craft during take-off, hover and landing operations and provides a cushion of air in normal flight. The horizontally mounted jet turbine provides main thrust for horizontal flight and vectored thrust for VTOL. The passenger cabin (21) is circular and is situated in the main body of the disc-shaped craft. Fuel tanks are situated around the circumference of the craft to maximise fuel capacity. The flight-deck (2) is situated at the top center of the craft, above the engine unit (15), which is detachable.

12 Claims, 6 Drawing Sheets

CIRCULAR VERTICAL TAKE OFF & LANDING AIRCRAFT

PRIORITY

This is a utility application with priority based on Prior Foreign Application number GB 0119318.4 filed Aug. 8, 2001 which relates to Priority Data Ref GB 0105706.6 filed Mar. 7, 2001.

U.K. GOVERNMENT RIGHTS

This invention is supported by a U.K. Government "Smart Award" Feasibility Study Ref. number 1007, with financial support from the Department of Trade and industry for the research and development of a working prototype. The U.K. Government has placed certain restrictions on the manufacture of this invention.

BACKGROUND OF THE INVENTION

The technical field of the invention relates to the design of disc-shaped aircraft with the capability of vertical take-off and landing, including hovering capability as well as fast forward flight.

The conventional helicopter's forward horizontal speed limit is due to unequal lift forces acting on the forward and retreating rotor-blades as speed increases: the invention disclosed overcomes this problem by using contra-rotating propellers which deliver thrust required for VTOL flight, in conjunction with a separate engine for horizontal thrust. The propellers are enclosed inside an annular chamber that has an air intake at the top, and an annular vent below, so that following the transition to horizontal flight, the propeller intake shutters can be closed allowing free airflow over the aerodynamic shape of the disc, and this provides the lift required for high-speed horizontal flight. With the propellers enclosed inside a chamber within the aircraft the present invention exhibits a notable safety feature by eliminating the risk of the propeller blades striking a person or an external object. Whereas conventional helicopter rotor-blades can crack and fall under severe stress of impact, causing catastrophic loss of the aircraft, the invention disclosed uses propellers that are inherently stronger than rotor-blades and have a smaller rotation-disc diameter for a given thrust performance. Existing helicopter rotor systems require complicated transmission gearing between the engine and rotor-shaft, together with complicated mechanisms that change the angle of attack of forward and retreating rotor-blades on every rotation, as well as controls to change both cyclic and collective pitch of the rotor disc. The present invention removes all the complex mechanism of the helicopter by providing a central vertically mounted engine with direct drive to the prop-shaft via a contra-rotating co-axial gearbox: it is therefore safer to fly and less expensive to maintain than a helicopter. A further safety feature allows for the auto-rotation of the propellers in event of engine failure, so that the pilot can effect an emergency landing with the aid of vectored down-thrust from the separate horizontal engine.

Preceding designs of circular plan-form aircraft such as the Avro VZ-9-Avrocar featured heavy turbo-fan engines situated laterally around a central fan that dissipated thrust to vents around the circumference of the aircraft to achieve both lift and horizontal thrust; but the available thrust was unable to achieve vertical take-off and un-countered torque forces resulted in instability. Similarly, recent designs for unmanned aerial vehicles using rotor systems driven by engines positioned laterally within an annular fuselage, dissipate the airflow below the rotor. In the invention disclosed, a light-weight turbine mounted vertically drives contra-rotating propellers that provide equilibrium and stability; and the airflow from the propellers is forced downward and outward through an annular funnel-shaped chamber. Aerodynamic control vanes situated in this pressurised airflow control the pitch, roll and yaw axis of the aircraft, together with aerofoils which provide additional lift forces. Previous disc-shaped designs have experienced a nose-up pitching moment in forward flight however: in the present design disclosed, this tendency to pitch-up is countered by the concave shape of the underside rim of the aircraft, (proved in wind-tunnel tests at Cranfield University U.K.), and by downward-vectored thrust from the horizontal jet engine. Recent wind-tunnel tests have also confirmed that the lenticular shape of the aircraft disclosed has a very high lift-to-draft ratio. Using this aerodynamic disc-shape with a horizontal thrust engine that can be steered through 360 degrees, the aircraft disclosed can fly and manoeuvre in any direction.

SUMMARY OF THE INVENTION

The invention comprises a circular VTOL aircraft which is capable of vertical and horizontal flight by combining propulsive power from horizontal contra-rotating propellers powered by a turboprop engine giving vertical thrust, and a jet turbine engine or engines, giving horizontal thrust. The stability of the aircraft is achieved by the gyroscopic effect of the high-speed rotation of two co-axial propellers, which can be geared to contra-rotate at the same speed thus avoiding the torque effect produced by a single rotor or propeller.

The jet engine (or engines), that provides horizontal thrust, is mounted on a steerable turntable pod at the centre-base of the aircraft in order to achieve rapid changes in direction through 360 degrees during flight manoeuvres: for example, from forward to reverse flight, from forward to sideways flight through 90 degrees, or from side-to-side flight through 180 degrees change in direction. The jet turbine may be fitted with vectored thrust nozzles to provide additional thrust on take-off. Alternatively, the turbine may be mounted on a gimbal bearing so that the engine can be angled upwards from the horizontal axis to provide additional take-off thrust.

This rapid manoeuvrability in the horizontal plane combined with a high rate of ascent or descent in the vertical plane, together with inherent stability as a weapons or personnel recovery platform, is designed to make the aircraft extremely effective for both military application and for civilian rescue operations: particularly rescue from fire in high-rise buildings or cliff-face rescue operations. A circular passenger compartment, as well as payload, fuel tanks and weapon bays may be incorporated in the main circular body of the aircraft. For the military application the passenger compartment area may be used both for weapons payload and for additional fuel tanks in order to extend the normal operating range. Weapons can be arranged to give 360 degrees of effective fire cover.

The aircraft is to be constructed using composite GRP and carbon-fibre reinforced materials, which are both strong and light in weight, and will enable the aircraft to exhibit a low radar profile. A feature of the design is the high fuel storage capacity, with fuel tanks installed around the circumference of the craft to make full use of the large outer area available; this high fuel capacity will enable the aircraft to out-range the conventional helicopter on passenger flights and rescue or military missions.

Another notable feature of the design is that the passenger compartment, cargo and fuel-tank areas are all integrated into the main body of the craft, which combines the functions of both wing and fuselage in one inherently strong disc-shape aerodynamically streamlined to generate lift in forward flight, thus avoiding existing problems such as wing-flutter and spar-failure associated with high loading on conventional aircraft designs. The circular passenger compartment can be designed either to maximise seating capacity of to include a small service area. (For example, the prototype aircraft is 12 metres in diameter and is designed to carry 24 passengers and 2 flight crew, with a fuel capacity of 33 cubic metres). The area designated for the passenger compartment may also be used for cargo carrying purposes. Alternatively, with the passenger compartment area replaced by water or foam tanks the craft can be used effectively as a fire-fighter having the ability to lift and dump a large quantity of water/foam from the circular tanks on each mission. The flight-deck is completely separate from the passenger compartment and is therefore inaccessible to high-jacking attempts.

The horizontal speed of the aircraft described is not limited by aerodynamic problems caused, by the difference in forward and retreating blade speeds of the helicopter rotor, because, in horizontal flight with the rotor intake-cover closed, the aerodynamic section of the disc-shaped aircraft produces an area of low pressure airflow over the trailing top half of the disc, generating lift in the same way as a conventional aircraft wing in forward flight. With the rotor intake-cover closed, the contra-rotating propellers are free to rotate at reduced cruising rpm sufficient to provide the gyroscopic stability required for horizontal flight; at the same time the rotor-chamber becomes partially vacated as air is expelled from the exit vent, allowing the propellers to rotate with reduced air friction, thereby conserving fuel for the turboprop's main purpose of vertical take-off and landing.

In the event of engine failure the contra-rotating propellers may be geared to auto-rotate to control the rate of descent of the aircraft for an emergency landing. The horizontal jet thrust may also be vectored downwards by vectored thrust nozzles, or by extending a flap from the underside of the aircraft to deflect thrust to cushion the landing, or when the jet engine is gimbal mounted, thrust can be angled downwards to control the rate of descent. In the event of the horizontal jet turbine engine failing, an emergency landing can be made with the controlled thrust of the turboprop engine and propellers.

The aircraft is designed to fly with the main disc-shaped body maintaining a level horizontal position through all stages of flight, thereby alleviating passenger discomfort experienced during pitch and bank changes in conventional aircraft. However, the aircraft is fitted with control vanes that are used to change or trim the pitch and roll movement of the disc in flight. A combination of thrust from both vertical and horizontal power units will achieve a 45 degree angle of ascent to cruising altitude with the aircraft maintaining a horizontal altitude. The landing approach can vary from vertical to 45 degrees, thus significantly reducing noise levels around major airports. Vertical ascent from a helicopter pad or small clearing area can be made using the vertical thrust power unit alone.

BRIEF DESCRIPTION OF THE DRAWINGS

A specific embodiment of the invention will now be described by way of example with reference to the accompanying drawings in which.

DETAILED DESCRIPTION OF THE INVENTION

Figure 1:
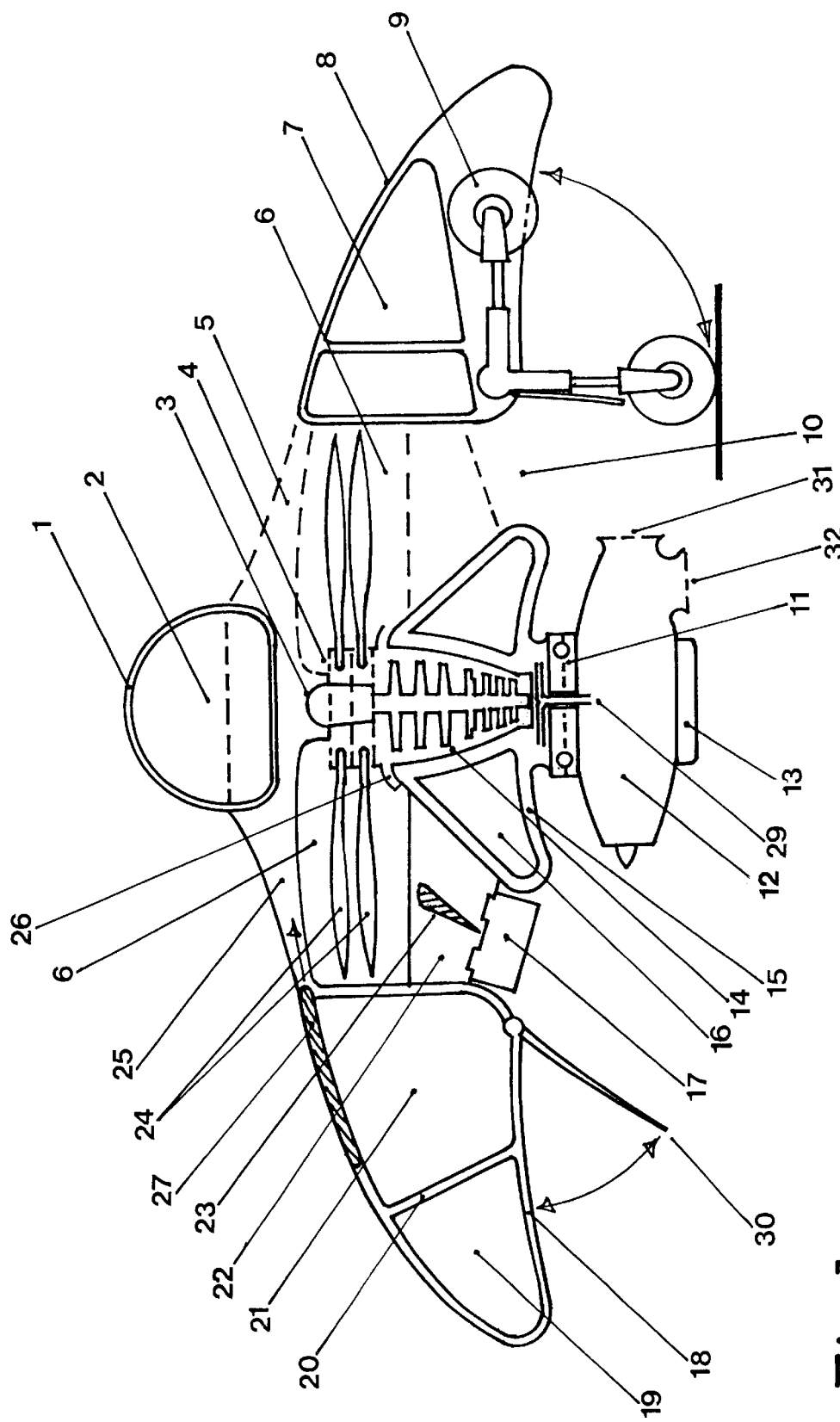
FIG. 1 shows a cross sectional elevation of the aircraft and illustrates the vertical and horizontal propulsion systems.

In FIG. 1 a turboprop engine 14 is mounted vertically in the centre of the aircraft and is geared to turn two multi-bladed co-axial contra-rotating propellers 24 within the rotor-chamber 6, which is formed by the circular space between the passenger compartment 21 and the main engine frame 15.

The propellers draw air into the circular air intake 5 at the top of the aircraft and then compress the air downward through the funnel-shaped rotor-chamber to the circular exit vent 10. Air is guided into and through the rotor-chamber by flow vanes 25 and 22 which span the top and bottom of the rotor-chamber respectively and these vanes also serve as structural support frames linking the engine frame with the main body of the aircraft. Aerofoil vanes 23, which are mounted upon flow vanes 22, are angled into the airflow below the propellers to generate an additional lift force. Vanes 23 may also be hinged as control surfaces to effect pitch and bank control of the craft. Similarly, aerofoil vanes 17 are hinge-mounted beneath vanes 22 to effect directional rudder trim control of the aircraft.

The said turboprop engine is mounted on structural engine frame 15, which is connected to the main body of the aircraft by structural frames 22. For servicing and repairs the central engine unit can be unbolted and completed removed from below the main body of the craft. Ancillary engine systems such as cooling plant, fuel pumps and electrical services are housed within the circular engine frame compartment 16.

Structural support frames 20 separate the internal compartments of the main body of the aircraft. The circular flight-deck 2 is supported above the central engine unit by structural frames 25, and is enclosed by hemispherical cockpit canopy 1.

The top fan-shaft bearing 3 connects the top of the turboprop engine to the upper structural framework 25 and the engine intake 4 draws main air from the main circular air intake 5, with the engine exhaust 26 discharging into the rotor-chamber. A lubrication point (not shown) may be installed in the top centre of fan-shaft bearing 3.

The jet turbine engine 12 is mounted to a rotatable turntable 11 which enables the pilot to turn the engine (via steering control) through 360 degrees then lock the turntable to the required course. The jet turbine is secured by a protective base plate 13, bolted to the turntable above the engine.

Figure 8:
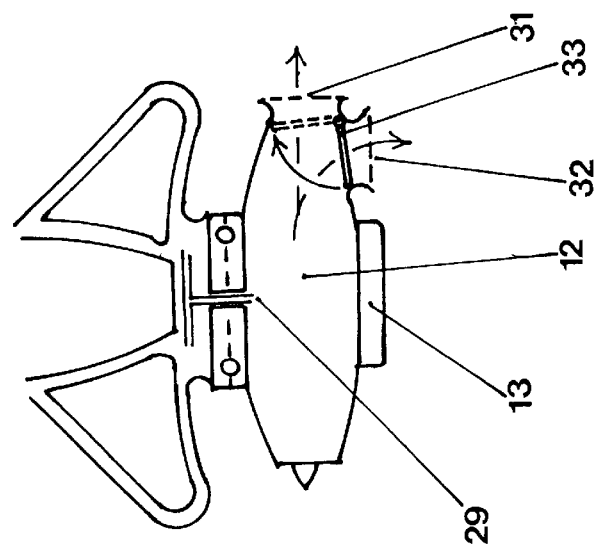
FIG. 8 shows a vectored thrust valve system for the jet turbine engine. (N.B. turn-table, gimbal, valves & bearings shown in the drawings are representational).
Figure 7:
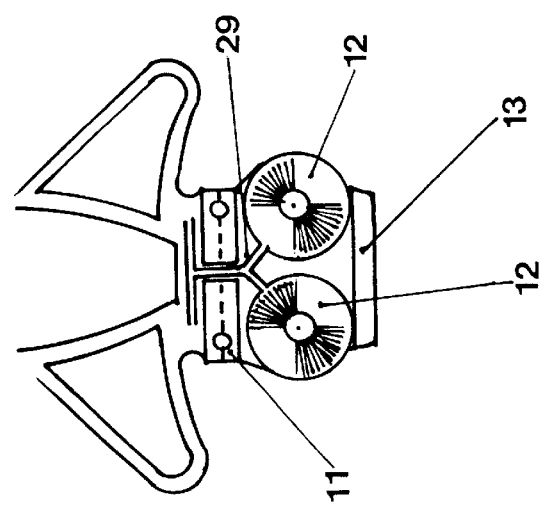
FIG. 7 shows a cross-sectional view of the fuel supply to the twin engine configuration.

As shown in FIG. 7, provision may be made for the single jet turbine-engine 12 to be supplanted by twin or multiple engines connected to the central turntable 11 in order to provide additional horizontal thrust. In FIG. 8, vectored thrust valve 33 (hinged to operate electrically or hydraulically) may be installed in the turbine vent to provide vectored thrust to horizontal thrust nozzle 31, or vertical thrust nozzle 32, in order to provide additional vertical thrust on take-off.

Figure 5:
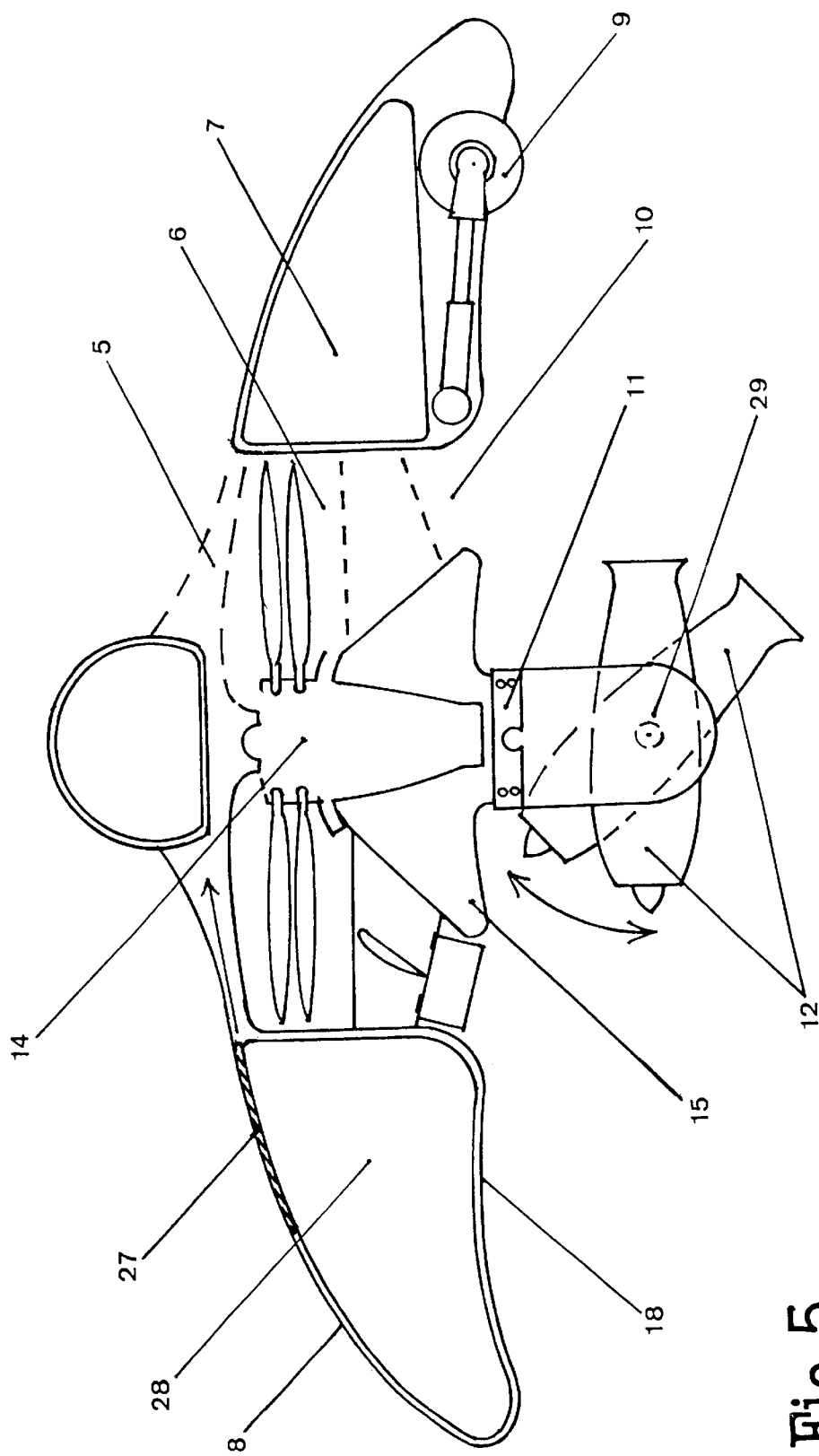
FIG. 5 shows a cross-sectional elevation of the aircraft with an alternative design adapted for airship methods of construction.

In FIG. 5 alternative engine mounting is shown whereby the jet-turbine engine 12 is secured to a gimbal bearing 29, which is connected to rotatable turntable 11. This allows the jet engine to be angled upward, thereby directing thrust downward for vertical take-off.

Figure 2:
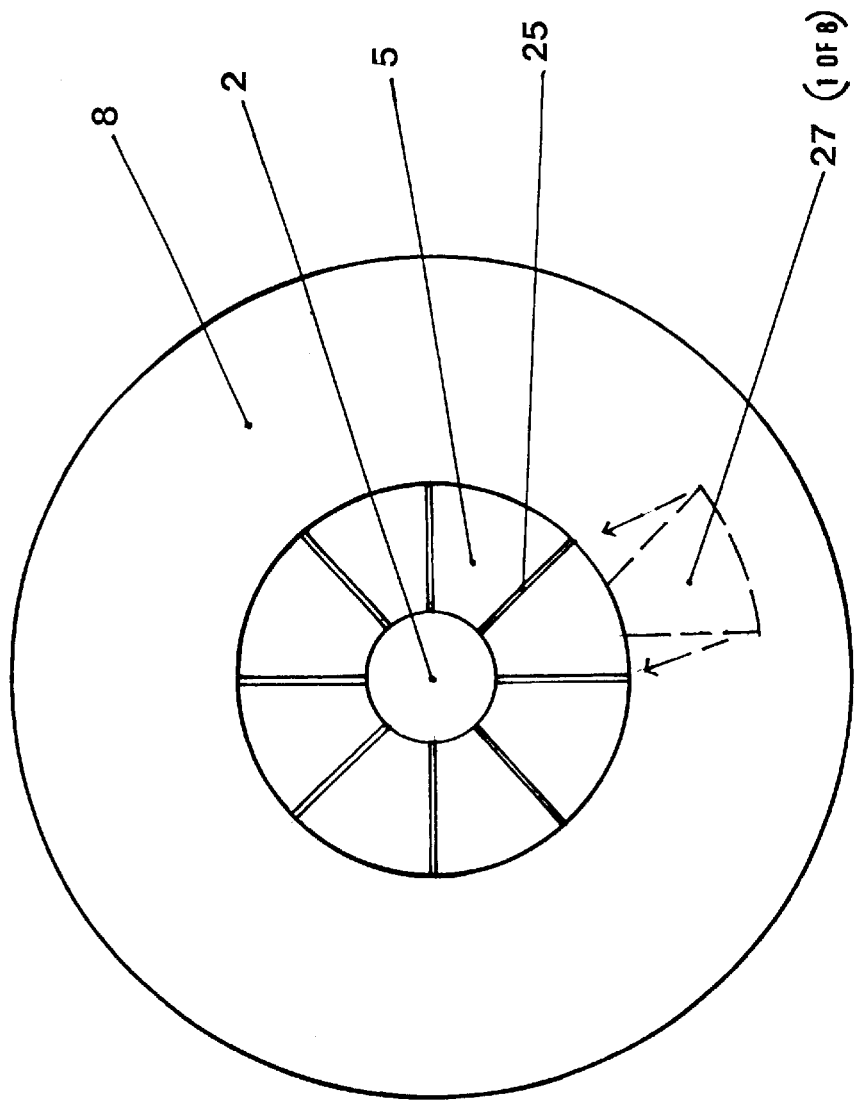
FIG. 2 shows a plan view of the top of the aircraft.
Figure 6:
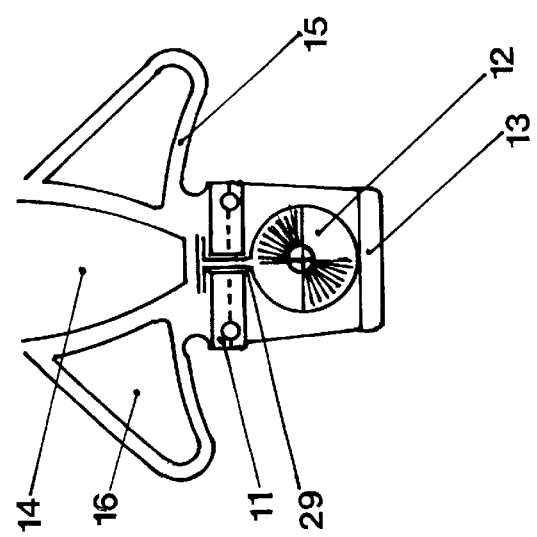
FIG. 6 shows a cross-sectional view of the fuel supply to the single turbine engine.

FIG. 2 shows the central flight deck 2 in relation to the surrounding circular rotor air-intake 5. The rotor intake covers 27 (only one typical section shown) are housed inside the top section of the main body 8, and are hydraulically controlled from open to closed or locked into the position required by the pilot to control the amount of airflow into the rotor-chamber. The retractable undercarriage units 9 are shown in plan position in FIG. 3, and have castoring main-wheels to allow free directional movement of the aircraft when taxiing. The space above the undercarriage bays may be used to accommodate additional fuel tanks 7. The main fuel tanks 19 are situated in the area shown at the circumference of the aircraft. Fuel is pumped to the engines via structural frames 22. In FIGS. 6 & 7, fuel and oil inflow pipes, which may be fitted with flow valves as required, deliver pressurized fuel and oil to the turbine-engine 12, and are installed to pass vertically through the centre of rotatable turntable 11, in order to allow the free rotation of the turntable and engine through 360 degrees of steerage in the horizontal plane.

Figure 3:
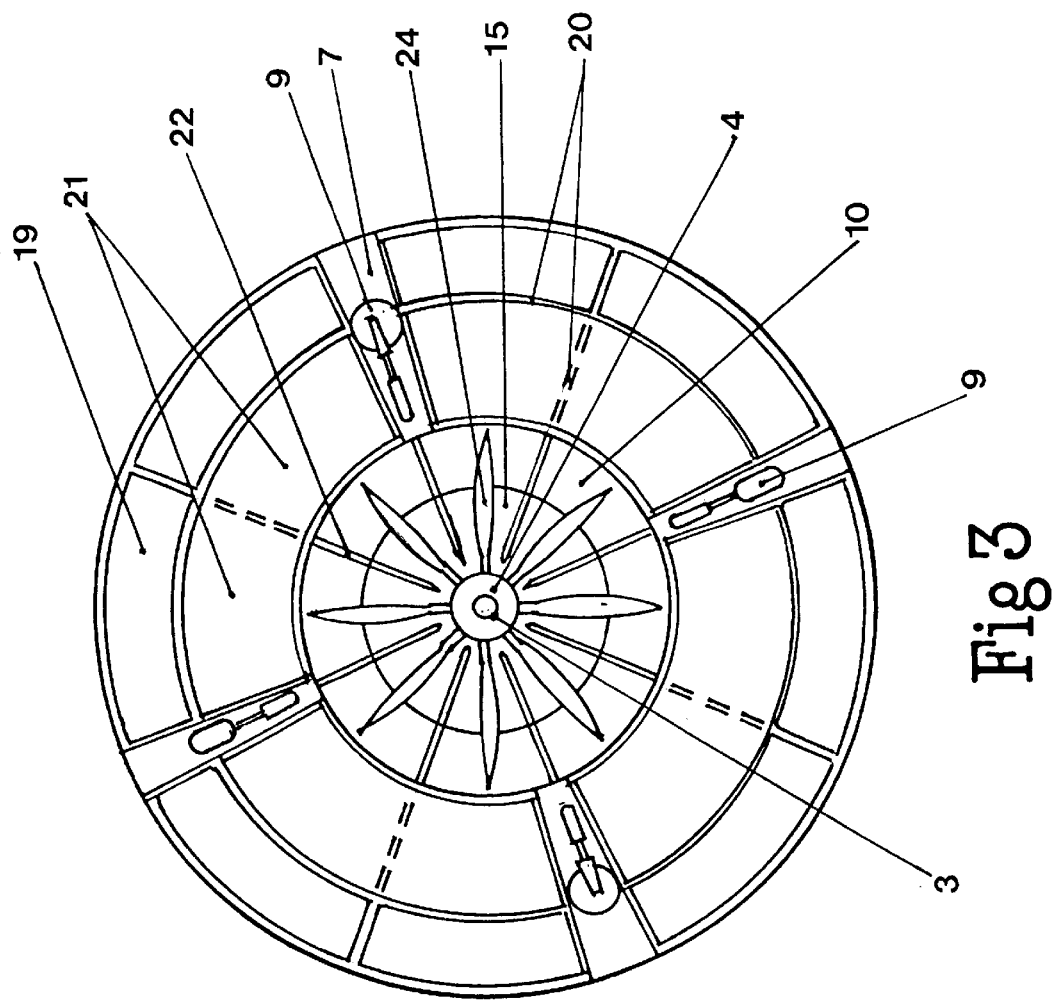
FIG. 3 shows a plan that illustrates the contra-rotating propellers, the passenger compartment, fuel tanks and undercarriage.

In FIG. 3, the contra-rotating propellers 24 are fitted with a variable pitch control so that fine-pitch plus high engine rpm can be selected for take-off and landing when maximum lift is required, and coarse pitch can be selected for cruising flight at a lower rpm setting. The direction of the aircraft can also be controlled by varying the rpm of the propellers so that the resulting torque force yaws the aircraft.

Passenger compartments 21 are situated in the main body of the aircraft are linked by a circular access corridor (not shown) and have access hatches and retractable steps which allow passengers to enter and exit from the underside 18, of the aircraft. In the fire-rescue version, personnel access is via the upper-surface 8 of the aircraft.

Figure 4:
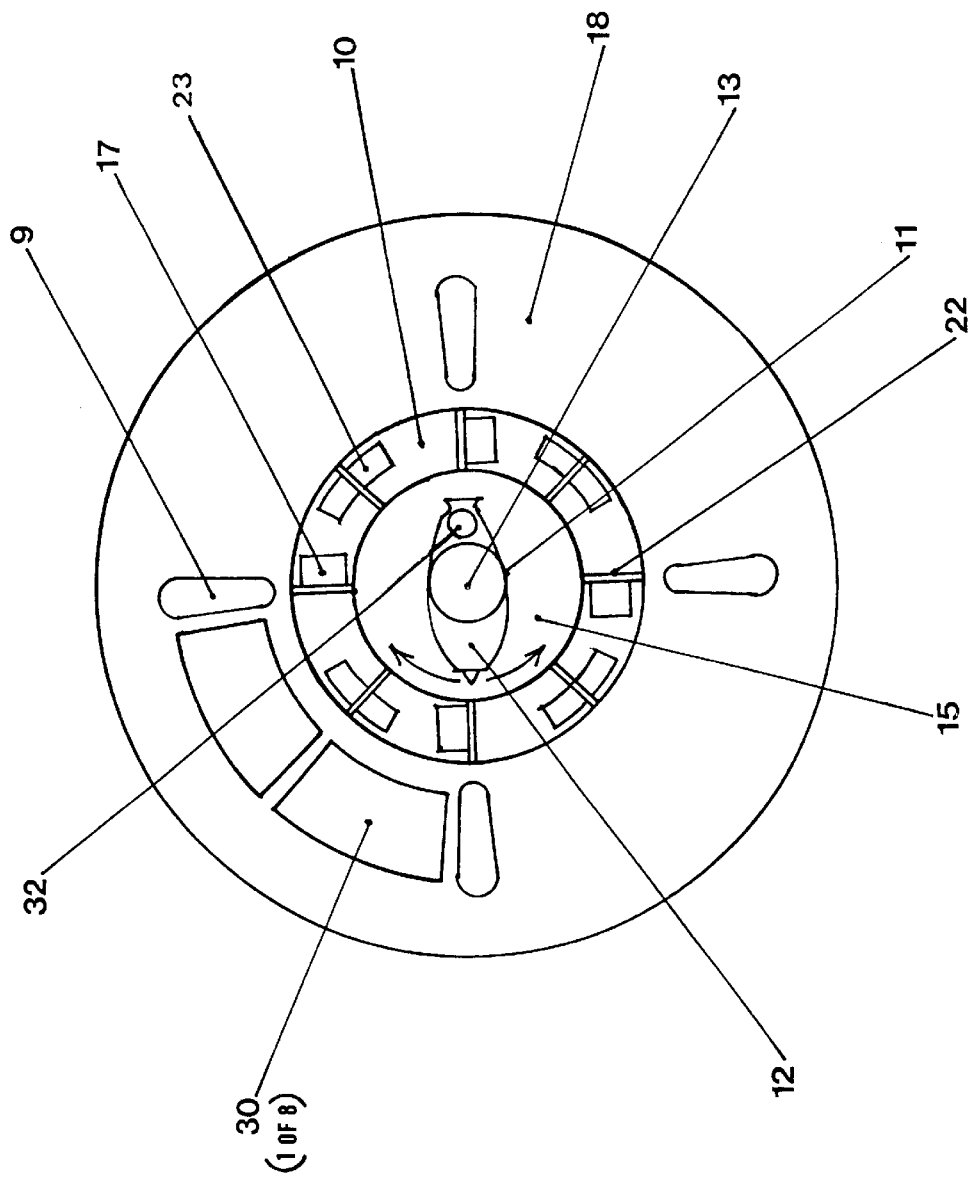
FIG. 4 shows a plan view of the underside of the aircraft and illustrates the jet turbine, the circular rotor chamber vent, control vanes, thrust deflecting flaps and undercarriage.

A plan view of the aircraft is shown in FIG. 4 illustrating the position of the jet turbine engine 12 which is mounted between turntable 11 and base-plate 13. This plan also shows the juxtaposition of trim vanes 17 and aerofoil vanes 23, effective in the airflow forced by the propellers through the rotor-chamber exit vent 10. Thrust deflecting flaps 30 may be lowered into the horizontal jet-stream to provide additional lift on take-off and landing, and can also be developed as air-brakes if required.

A further application of the invention described above is illustrated in FIG. 5 with an alternative design adapted for use as an airship, employing an inert gas such as helium as a buoyancy agent, where the main body of the craft is filled with gas buoyancy chambers 28. For example a 15 metre diameter airship can accommodate 1200 cubic metres of helium gas which gives buoyancy equivalent to 1200 kg weight (1 cubic metre of helium supports 1 kilogram weight). The airship can therefore be designed to be weightless at ground level, rather than lighter than air as a conventional airship, so that minimal thrust is required from the contra-rotating propellers to achieve vertical take-off. With the contra-rotating propellers in reverse providing a controlled downward force, existing problems of airship control and tethering on landing are eliminated.

What is claimed is:

1. A circular Vertical Take-Off and Landing (VTOL) aircraft comprising:
    an aerodynamic disc shaped airframe;
    a central jet turbo-prop engine mounted in a vertical axis position and geared to turn contra-rotating co-axial propellers which provide thrust for the aircraft and hovering flight;
    at least one turbojet engine mounted horizontally and secured to a central turntable unit which can be steered through 360 degrees to enable the aircraft to move horizontally in any direction;
    a funnel-shaped annular chamber within the airframe wherein the contra-rotating propellers draw air downward into an annular intake in the top surface of the aircraft, said propellers forcing air downward and outward to an annular exit vent in the underside of the aircraft;
    a central flight-deck having a hemispherical canopy at the top of the aircraft, said flight-deck being supported above the at least one turbo-jet engine by a structural frame;
    a plurality of aerodynamic control vanes situated in the lower area of the annular chamber and hinged to operate in the airflow from the propellers in order to affect the pitch, roll and yaw of the aircraft;
    a plurality of aerodynamic vanes within the annular chamber in the airflow from the propellers in order to generate additional lift force;
    a plurality of thrust deflecting flaps that can be lowered from the underside of the aircraft to deflect the horizontal jet thrust and to act as airbrakes.

2. The circular VTOL of claim 1, wherein said at least one turbojet engine, which provides horizontal thrust is fitted with at least one vectored thrust nozzle that directs thrust downward to provide additional thrust for take-off, landing and hovering flight.

3. The circular VTOL aircraft of claim 1 or 2, wherein the funnel-shaped annular chamber is fitted with sliding intake covers which, when closed prevent the inflow of air into the funnel-shaped annular chamber thereby allowing the propellers to rotate in a partial vacuum, at the same time allowing air to flow freely over the top of the airframe in forward horizontal flight.

4. The circular VTOL aircraft of claim 1 or 2, further comprising a circular passenger compartment, a payload, fuel tanks and weapon bays being incorporated in the main circular body of the aircraft.

5. The circular VTOL of claims 1 or 2, wherein the fuel tanks are incorporated around at least one of the inner and outer circumference of the main body of the aircraft.

6. The circular VTOL aircraft of claims 1 or 2, wherein the central engine frame has a cone shape with a concave base, and wherein the complete engine unit can be detached from the main outer airframe of the aircraft.

7. The circular VTOL of claim 1 adapted for use as an airship, wherein the main body of the aircraft contains gas buoyancy chambers, and wherein a central turboprop engine turning contra-rotating co-axial propellers is mounted in the vertical axis position above the at least one turbojet engine, said at least one turbojet engine is mounted horizontally on a central turntable unit which can be steered through 360 degrees, said at leas one turbojet engine being fitted with a gimballed frame so that the at least one engine can be tilted about a horizontal axis which is perpendicular to the longitudinal axis.

8. The circular VTOL aircraft as claimed in claims 1 or 2 or 7, wherein passenger access hatches can be fitted to give access to a passenger compartment situated in the main body of the aircraft.

9. A circular VTOL aircraft as claimed in claims 1 or 2, wherein fuel tanks are incorporated around the circumference of the main body of the aircraft.

10. A circular VTOL aircraft as claimed in claims 1 or 2, which has a central flight-deck situated above at lest one of the turbo engines.

11. A circular VTOL aircraft as claimed in claim 1 or 2, wherein the central engine frame can be detached from the main outer body of the aircraft.

12. A circular VTOL aircraft as claimed in claims 1 or 2, wherein the main body of the aircraft contains gas buoyancy chambers.

* * * * *